US008808124B2

(12) United States Patent
Major et al.

(10) Patent No.: US 8,808,124 B2
(45) Date of Patent: Aug. 19, 2014

(54) BELT ALTERNATOR STARTER SYSTEMS FOR HYBRID VEHICLES

(75) Inventors: Gregory A. Major, Farmington Hills, MI (US); Steven A. Tarnowsky, West Bloomfield, MI (US)

(73) Assignee: GM Global Technology Operations LLC

( * ) Notice: Subject to any disclaimer, the term of this patent is extended or adjusted under 35 U.S.C. 154(b) by 374 days.

(21) Appl. No.: 12/103,317

(22) Filed: Apr. 15, 2008

(65) Prior Publication Data
US 2009/0255741 A1 Oct. 15, 2009

(51) Int. Cl.
*F02B 67/06* (2006.01)

(52) U.S. Cl.
USPC ........ 475/5; 474/86; 180/65.265; 180/65.275

(58) Field of Classification Search
USPC .......... 474/84–89; 477/2–6; 180/65.21–65.29
See application file for complete search history.

(56) References Cited

U.S. PATENT DOCUMENTS

| 4,257,508 | A | | 3/1981 | Bennett et al. |
|---|---|---|---|---|
| 5,635,805 | A | | 6/1997 | Ibaraki et al. |
| 6,048,288 | A | * | 4/2000 | Tsujii et al. ................ 477/5 |
| 6,155,366 | A | * | 12/2000 | Lin .......................... 180/65.25 |
| 6,251,042 | B1 | * | 6/2001 | Peterson et al. ............... 477/3 |
| 6,453,865 | B2 | * | 9/2002 | Hirose et al. ............. 123/179.4 |
| 6,852,063 | B2 | * | 2/2005 | Takahashi et al. ............. 477/5 |
| 7,004,864 | B2 | * | 2/2006 | Hotta ......................... 474/135 |
| 7,582,034 | B2 | * | 9/2009 | Usoro ............................ 475/5 |
| 8,328,673 | B2 | * | 12/2012 | Smith et al. .................... 475/5 |
| 2004/0116227 | A1 | | 6/2004 | Fujioka et al. |
| 2007/0117668 | A1 | | 5/2007 | Sowul et al. |

FOREIGN PATENT DOCUMENTS

DE 102006054364 A1 7/2007

OTHER PUBLICATIONS

Siemens VDO Hybrid Drives, Full-Hybrid Sport Coupé, © Siemens VDO Automotive 2007, Mar. 20, 2007, pp. 1-22.
German Office Action, dated Jun. 29, 2011, from German Patent Office, for Application No. 102009016911.3, 6 pages.

* cited by examiner

*Primary Examiner* — Jeffrey J Restifo
*Assistant Examiner* — Erez Gurari

(57) ABSTRACT

A belt alternator starter (BAS) system for a hybrid vehicle may include a first pulley, a first belt, a motor generator unit (MGU), a second pulley, a second belt, and a first clutch. The first belt encircles the first pulley and a crankshaft pulley of an internal combustion engine. The MGU includes the second pulley and functions as an electric motor when the engine is started and as a generator for charging a battery when the engine is running. The second belt encircles the second pulley and at least one drive pulley of an accessory unit. The first clutch couples/decouples the crankshaft pulley to/from the second pulley depending on operation of the engine.

7 Claims, 4 Drawing Sheets

BELT ALTERNATOR STARTER SYSTEMS FOR HYBRID VEHICLES

FIELD

The present disclosure relates to electric machines for hybrid vehicles, and more particularly to belt alternator starter (BAS) systems for hybrid vehicles.

BACKGROUND

The statements in this section merely provide background information related to the present disclosure and may not constitute prior art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A hybrid electric vehicle may use both an internal combustion engine and an electric motor to provide torque for transmission in order to maximize fuel economy. To start an engine of a hybrid vehicle, a motor generator may function as an electric motor and draw electrical energy from a battery pack to drive the engine crankshaft. When the engine is running, the motor generator may function as a generator and be driven by the engine to recharge the battery pack.

In conventional hybrid vehicles, vehicle accessories, including but not limited to, air conditioning compressors, power steering pumps, water pumps, and secondary air pumps, are commonly powered by the engine. For example, the battery pack for the motor generator may lack the capacity to propel the vehicle and drive the vehicle accessories at the same time. This is especially true for mild hybrid vehicles. Generally, the motor generator of a mild hybrid vehicle may have very limited ability to propel a vehicle independently. To ensure proper operation of the vehicle accessories when the engine is off, multiple drive motors may be incorporated for driving the vehicle accessories. The multiple drive motors, however, take up space in the vehicles and add cost and weight.

SUMMARY

Accordingly, a belt alternator starter (BAS) system for a hybrid vehicle may include a first pulley, a first belt, a motor generator unit (MGU), a second pulley, a second belt, and a first clutch. The first belt encircles the first pulley and a crankshaft pulley of an internal combustion engine. The MGU includes the second pulley and functions as an electric motor when the engine is started and as a generator for charging a battery when the engine is running. The second belt encircles the second pulley and at least one drive pulley of an accessory unit. The first clutch couples/decouples the crankshaft pulley to/from the second pulley depending on operation of the engine.

In another aspect, a hybrid vehicle may include an internal combustion engine that includes a crankshaft pulley, a first pulley, a first belt that encircles the crankshaft pulley and the first pulley, a motor generator unit (MGU), an accessory unit, a second belt, and a first clutch. The MGU includes a second pulley and functions as an electric motor when the engine is started and as a generator for charging a battery when the engine is running. The second belt transmits torque from the second pulley to the accessory unit. The first clutch couples/decouples the crankshaft pulley to/from the second pulley depending on operation of the engine.

In another aspect, a method of operating a belt alternator starter (BAS) system of a hybrid vehicle may include decoupling a crankshaft pulley from a motor generator unit (MGU) when the vehicle is idling, shutting off an engine when the vehicle is idling, and driving an accessory unit by the MGU when the engine is shut off.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
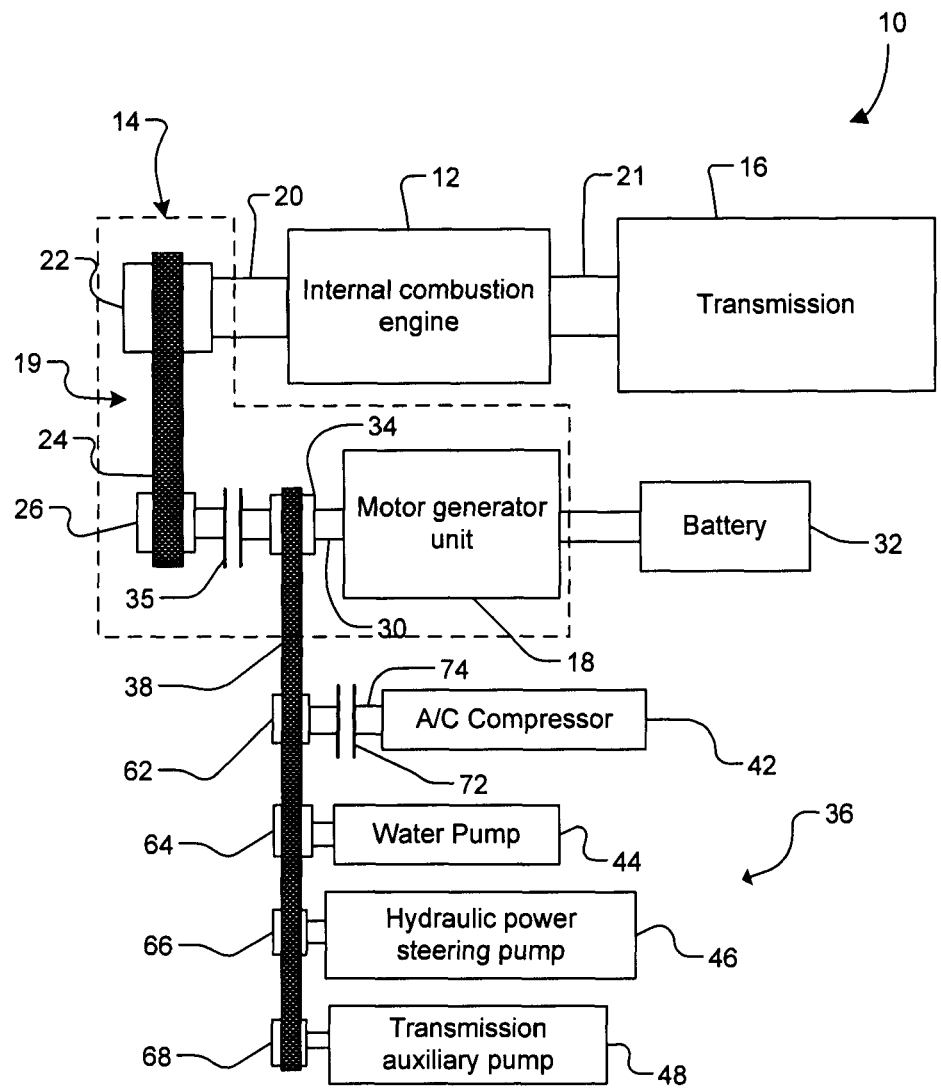
FIG. 1 is a functional block diagram of a hybrid vehicle according to the present disclosure, showing an arrangement of the internal combustion engine, a belt alternator starter (BAS) system, and an accessory unit.

The following description is merely exemplary in nature and is not intended to limit the present disclosure, application, or uses. It should be understood that throughout the drawings, corresponding reference numerals indicate like or corresponding parts and features.

The belt alternator starter (BAS) system of the present disclosure is coupled to an internal combustion engine to replace an alternator (and a starter motor, if any) in a conventional vehicle. The BAS system may include a motor generator unit (MGU), a first belt drivingly coupling a motor generator unit (MGU) to the engine, and a second belt drivingly coupling the MGU to vehicle accessory devices. A clutch is provided to decouple the first belt from the MGU when the engine is off so that torque from the MGU is not transmitted to the engine when the vehicle is idling. Accordingly, the engine does not become a load to the MGU when the engine is off (e.g., when the vehicle is stopped for a stop light). The battery may effectively power the vehicle accessory devices through the MGU while having sufficient energy to restart the engine when engine start is requested.

Figure 2:
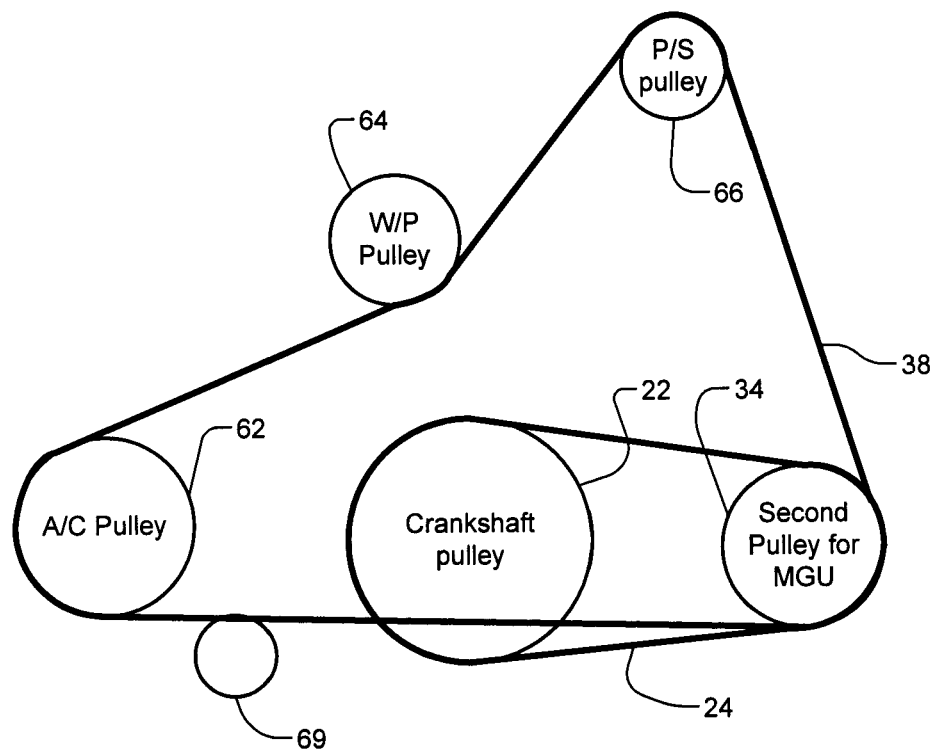
FIG. 2 is a functional block diagram showing a coupling arrangement of a crankshaft pulley, a pulley of motor generator unit (MGU), and drive pulleys of accessory devices.

Referring to FIGS. 1 and 2, a hybrid vehicle 10 may include an internal combustion engine ("engine") 12 and a belt-alternator-starter (BAS) system 14. The engine 12 provides torque to a transmission unit 16 to propel the vehicle 10. The BAS system 14 includes a motor generator unit (MGU) 18 to provide engine start, electric power assist, and regenerative braking. The MGU 18 may function as an electric motor when the engine 12 is started and/or when power assist to the engine 12 is necessary. The MGU 18 may function as a generator for charging a battery when the engine 12 is running. The MGU 18 combines an alternator and a starter motor/generator into one device and is coupled to the engine 12 by a belt and pulley assembly 19. The MGU 18 may be disposed adjacent to the engine 12 at a lateral distance from the engine 12 and may be mounted in effectively the same way and the same packaging space as a traditional alternator. As such, the BAS system 14 works with a conventional transmission and therefore requires little driveline change.

The transmission unit 16 includes, but is not limited to, a manual transmission, an automatic transmission, a continuously variable transmission (CVT) and an automated manual transmission (AMT). The engine 12 includes a crankshaft 20. The crankshaft 20 has one end coupled to the transmission unit 16 through a coupling device 21 and the other end connected to a crankshaft pulley 22. The engine 12 is coupled to the BAS system 14 by a first belt 24. The first belt 24 encircles the crankshaft pulley 22 and a first pulley 26 of the BAS system 14. As such, torque from the BAS system 14, particularly the MGU 18, may be transmitted to the crankshaft pulley 22 and the crankshaft 20 to start the engine 12 and torque from the engine 12 may be transmitted to the MGU 18 to charge a battery 32 coupled to the MGU 18.

The MGU 18 may include a drive shaft 30 having an end coupled to the battery 32 and the other end coupled to a second pulley 34, a first clutch 35, and the first pulley 26. The battery 32 provides electrical energy to the MGU 18 for engine start. An accessory unit 36 may be coupled to the MGU 18 by a second belt 38. The accessory unit 36 may include a single accessory device or a plurality of accessory devices. In the illustrative example of FIG. 1, the accessory unit 36 includes a plurality of accessory devices, including but not limited to, an air conditioner compressor 42, a water pump 44, a hydraulic power steering pump 46, and a transmission auxiliary pump 48. The second belt 38 encircles the second pulley 34 and a drive pulley 62 of the air conditioner compressor 42, a drive pulley 64 of the water pump 44, a drive pulley 66 of the hydraulic power steering pump 46, and a drive pulley 68 of the transmission auxiliary pump 48. As such, torque from the MGU 18 or the engine 12 may be transmitted to the accessory unit 36. A tensioning device 69 (shown in FIG. 2) may be provided to removably engage the second belt 38 to adjust the tension of the second belt 38 when necessary.

The first clutch 35 is provided between the first pulley 26 and the second pulley 34 for coupling/decoupling the first pulley 26 to/from the second pulley 34 depending on the vehicle operating conditions. The first pulley 26 and the second pulley 34 are aligned along an axis of the drive shaft 30 of the MGU 18. The first clutch 35 may be a hydraulic or electric clutch and may be normally engaged. To start the engine 12, the first clutch 35 is engaged and the MGU 18 draws energy from the battery 32 to drive and start the engine 12 via the first belt 24. Concurrently, the MGU 18 drives the drive pulleys 62, 64, 66, 68 and the associated accessory devices 42, 44, 46, 48 of the accessory unit 36 via the second belt 38.

When the engine 12 is running, the first clutch 35 remains engaged and the engine 12 may drive the MGU 18 to recharge the battery 32 and to provide power for the accessory unit 36. At this moment, the MGU 18 functions as a generator.

When the hybrid vehicle 10 is idling, the first clutch 35 is disengaged to decouple the first pulley 26 from the second pulley 34. The engine 12 may then be shut off to reduce fuel consumption. The MGU 18 is switched on and functions as an electric motor. The MGU 18 draws energy from the battery 32 to power the accessory unit 36. The torque from the MGU 18 is not transmitted to crankshaft pulley 22 and the engine 12 due to the decoupling of the first pulley 26 from the second pulley 34. Because the crankshaft 22 and the engine 12 do not become a load to the MGU 18 when the vehicle 10 is idling, using the battery 32 to power the accessory unit 36 does not consume unnecessary energy from the battery 32. As such, sufficient energy remains in the battery 32 to restart the engine 12.

When a restart request is received (for example, when a brake pedal is released), the first clutch 35 is engaged. The torque from the MGU 18 may be transmitted to the first pulley 26 and the first belt 24 to drive the crankshaft pulley 22 and the crankshaft 20 to restart the engine 12. When the engine 12 is running, the engine 12 may recharge the battery 32 so that the battery 32 may conserve energy in preparation for the next vehicle idling to drive the accessory unit 36 and for the next engine start. The accessory unit 36 is driven by the engine 12 when the engine 12 is running. Throughout the vehicle operation, the accessory unit 36 is constantly driven either by the engine 12 or by the MGU 18.

The first clutch 35 may be briefly disengaged when the engine 12 runs at high RPM to allow for Wide Open Throttle (WOT) boost. By decoupling the first pulley 26 from the second pulley 34, the driving torque from the engine 12 may not be transmitted to the MGU 18 and the accessory unit 36. Because the MGU 18 and the accessory unit 36 do not become a load during the WOT boost, the engine RPM may be increased at a higher rate. During the WOT boost, the accessory unit 36 may be driven by the MGU 18.

A second clutch 72 may be provided between the pulley 62 and a shaft 74 of the A/C compressor 42. The second clutch 72 is normally engaged and may be disengaged when the engine 12 or the MGU 18 demands more power under certain operating conditions. By decoupling the A/C compressor 42 from the drive pulley 62, the A/C compressor 42 does not become a load to the engine 12 or the MGU 18 so that less fuel or less power is consumed when the A/C compressor 42 is not in use. While not shown in the drawings, it is understood and appreciated that additional clutches may be provided to other accessory devices for individually controlling engagement/disengagement of the accessory devices to/from the second belt 38.

A control system (not shown) may be provided to monitor the clutch condition for the purpose of analysis/development/validation (ADV). The condition of the second belt 36 may be monitored to ensure speed synchronism and to determine clutch slip for ADV.

When the first clutch 35 fails to engage as desired and the engine 12 remains decoupled from the MGU 18, the vehicle 10 may be operated in a "limp home mode". When the first clutch 35 fails to disengage as desired and the MGU 18 remains coupled to the engine 12, the engine 12 off-mode is disabled so that the engine 12 continues running whether the vehicle 10 is running or idling. When the engine 12 off-mode is disabled, the vehicle 10 may still perform deceleration fuel cut off (DFCO) and regenerative braking.

Figure 3:
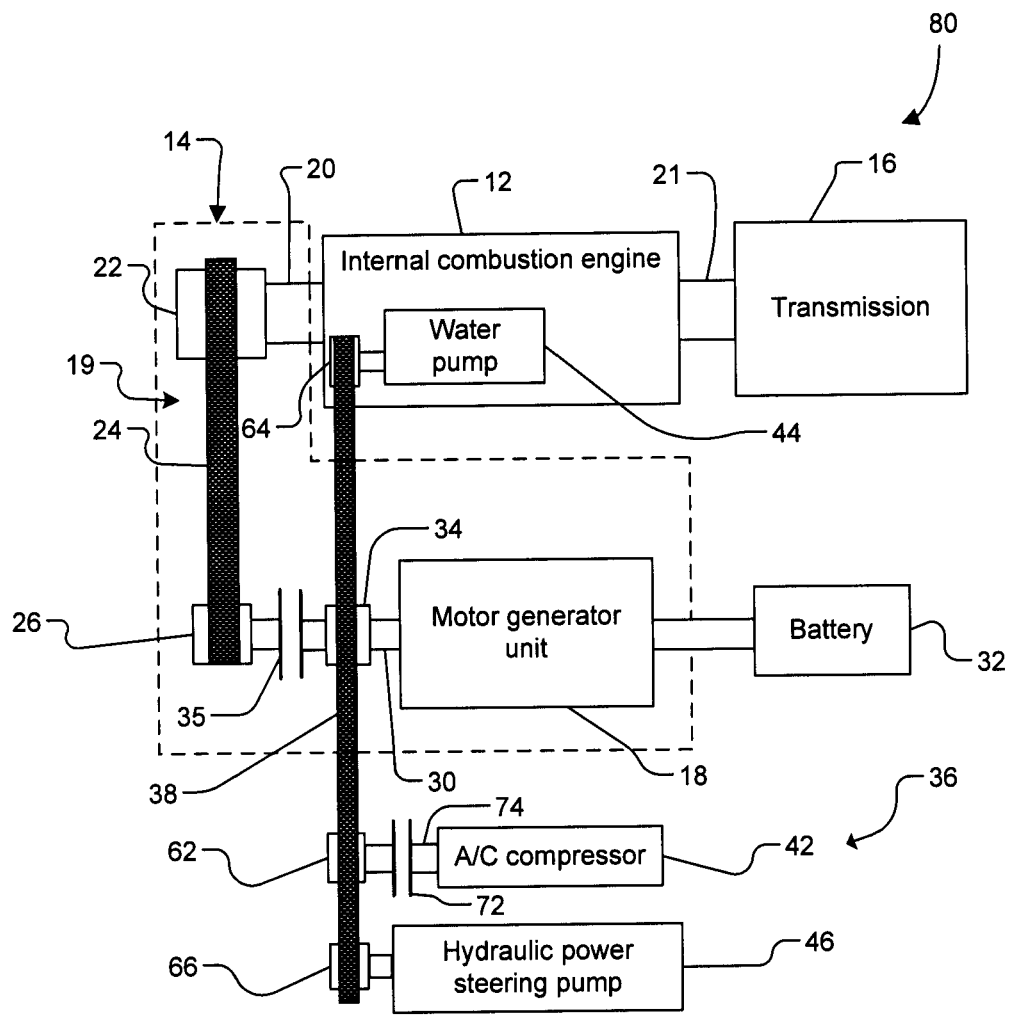
FIG. 3 is a functional block diagram of a hybrid vehicle according to a variant of the present disclosure, showing an arrangement of an internal combustion engine, a BAS system, and an accessory unit.

Referring to FIG. 3, a hybrid vehicle 80 includes a water pump 44 that may be incorporated into the engine 12 as a single unit. The water pump 44, the A/C compressor 42 and the hydraulic power steering pump 46 are driven by the MGU 18 through the second belt 38. This construction may allow for a more compact construction for the engine 12 and the BAS system 14.

While the second belt 38 is shown as a serpentine belt in FIG. 3, it should be understood and appreciated that multiple belts may be used to connect the second pulley 34 to the individual drive pulleys 62, 64, 66 of the vehicle accessory devices 42, 44, 46 without departing from the spirit of the present disclosure.

Figure 4:
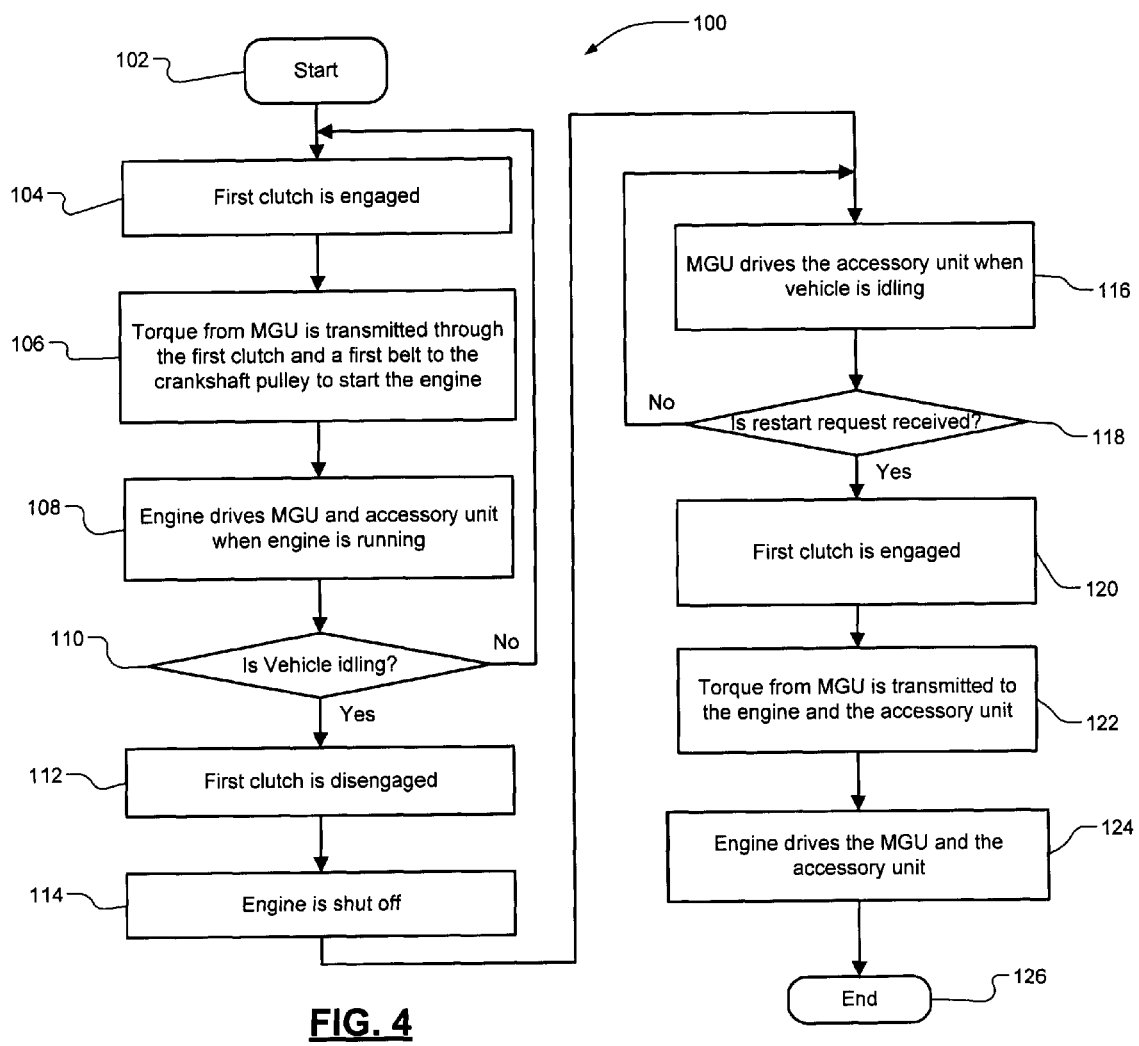
FIG. 4 is a flow diagram of a method of operating a hybrid vehicle.

Referring to FIG. 4, a method 100 of operating a hybrid vehicle 10 starts in step 102. In step 104, the first clutch 35 is normally engaged and the first pulley 26 is coupled to the second pulley 34. To start the engine 12 in step 106, the MGU 18 draws energy from the battery 32. Torque from the MGU 18 can be transmitted from the second pulley 34, through the first pulley 26, and the first belt 24, to the crankshaft pulley 22 and the engine 12. Concurrently, torque is transmitted from the second pulley 34 to the plurality of drive pulleys 62, 64, 66, 68 to drive the associated accessory devices 42, 44, 46, 48 of the accessory unit 36. When the engine 12 is running, the engine 12 drives the MGU 18 and the accessory unit 36 in step 108.

When the hybrid vehicle 10 is stopped for a stop light and is idling in step 110, the first clutch 35 is disengaged to break the torque transmission from the MGU 18 to the crankshaft pulley 22 and the engine 12 in step 112. The engine 12 is shut off in step 114. The MGU 18 draws the energy from the battery 32 and transmits torque only to the drive pulleys 62, 64, 66, 68 of the accessory devices 42, 44, 46, 48 in step 116. The energy is not wasted on driving the crankshaft pulley 22, the crankshaft 20, and the engine 12 when the hybrid vehicle 10 is idling.

When a restart request is received in step 118, the first clutch 35 is engaged in step 120. Therefore, torque from the MGU 72 is transmitted to the crankshaft pulley 22 and the engine 12 through the second pulley 34, the first clutch 35, the first pulley 26, and the first belt 26 to start the engine 12 in step 122. Concurrently, the MGU 72 drives the accessory unit 36. After the engine 12 is started, the engine 12 drives the MGU 18 and the accessory unit 36 in step 124. The MGU 18 functions as a generator to recharge the battery 32. The whole process ends in step 126.

In the dual-belt BAS system 14 of the present disclosure, the first belt 24 is used for coupling the MGU 18 to the crankshaft pulley 22. Because the first belt 24 connects only the crankshaft pulley 22 and the first pulley 26 that may be disposed adjacent to each other, the first belt 24 may be made relatively short compared with a belt for a conventional BAS system. As a result, a tensioning device for adjusting the tension of the first belt 24 may not be required. Further, the BAS system 14 of the present disclosure dispenses with the need for a bi-directional tensioning system that is normally required in a conventional single-belt BAS system, thereby saving the costs.

It should be understood and appreciated that while the second belt 38 in the illustrative examples of FIGS. 1 and 3 are shown to encircle multiple drive pulleys for multiple accessory devices, the second belt 38 may encircle only one drive pulley to drive a single accessory device without departing from the spirit of the present disclosure.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A belt alternator starter (BAS) system for a hybrid vehicle, comprising:
    a motor generator unit (MGU) that includes a driveshaft;
    a first pulley that is coupled to the driveshaft of the MGU and that is disposed along an axis of the driveshaft of the MGU;
    a first belt that encircles the first pulley and at least one drive pulley of an accessory unit;
    a second pulley that is disposed along the axis of the driveshaft of the MGU;
    a second belt that encircles the second pulley and a crankshaft pulley of an engine; and
    a clutch that couples and decouples the second pulley to and from the first pulley depending on one or more operating conditions,
    wherein the clutch decouples the second pulley from the first pulley when the engine is operating at greater than a predetermined speed, and
    wherein the MGU drives the first pulley, the first belt, and the at least one drive pulley of the accessory unit when the engine is operating at greater than the predetermined speed and the first pulley is decoupled from the second pulley.

2. The BAS system of claim 1 wherein the clutch couples the second pulley to the first pulley when the engine is running.

3. The BAS system of claim 1 wherein the clutch decouples the second pulley from the first pulley when the hybrid vehicle is idling.

4. The BAS system of claim 1 wherein, when the engine is off:
    the clutch decouples the second pulley from the first pulley; and
    the MGU drives the at least one drive pulley of the accessory unit via the first belt.

5. The BAS system of claim 1 wherein:
    the clutch couples the second pulley to the first pulley; and
    the MGU drives the crankshaft pulley via the second belt to start the engine.

6. The BAS system of claim 5 wherein, while the MGU drives the crankshaft pulley via the second belt, the MGU further drives the at least one drive pulley of the accessory unit via the first belt.

7. The BAS system of claim 1 wherein, when the engine is running:
    the clutch couples the second pulley to the first pulley;
    the engine drives the MGU via the first belt; and
    the MGU functions as a generator to charge a battery.

\* \* \* \* \*